(12) United States Patent
Kaneko et al.

(10) Patent No.: US 11,640,078 B2
(45) Date of Patent: May 2, 2023

(54) LIGHT CONTROL DEVICE

(71) Applicant: TOPPAN Inc., Tokyo (JP)

(72) Inventors: Norihiko Kaneko, Taito-ku (JP); Souhei Abe, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 0 days.

(21) Appl. No.: 17/729,623

(22) Filed: Apr. 26, 2022

(65) Prior Publication Data

US 2022/0299804 A1 Sep. 22, 2022

Related U.S. Application Data

(63) Continuation of application No. PCT/JP2020/040822, filed on Oct. 30, 2020.

(30) Foreign Application Priority Data

Nov. 1, 2019 (JP) .............................. JP2019-200182

(51) Int. Cl.
*G02F 1/1333* (2006.01)
*G02F 1/1337* (2006.01)
(Continued)

(52) U.S. Cl.
CPC ........ *G02F 1/1334* (2013.01); *G02F 1/13306* (2013.01); *G02F 1/13439* (2013.01); *G02F 1/1337* (2013.01)

(58) Field of Classification Search
CPC ............... G02F 1/13306; G02F 1/1333; G02F 1/133365; G02F 1/1334; G02F 1/13345;
(Continued)

(56) References Cited

U.S. PATENT DOCUMENTS

| 2015/0330597 A2 | 11/2015 | Schaffer et al. |
| 2021/0072572 A1 | 3/2021 | Yamada et al. |
| 2022/0107522 A1* | 4/2022 | Popov ................. G02F 1/13345 |

FOREIGN PATENT DOCUMENTS

| JP | 2015-215420 A | 12/2015 |
| JP | 2017-223950 A | 12/2017 |

(Continued)

OTHER PUBLICATIONS

International Search Report dated Jan. 19, 2021 in PCT/JP2020/040822 filed Oct. 30, 2020, 5 pages (with English Translation).

(Continued)

*Primary Examiner* — Thoi V Duong
(74) *Attorney, Agent, or Firm* — Oblon, McClelland, Maier & Neustadt, L.L.P.

(57) ABSTRACT

A driver circuit applies a voltage such that clarity of a light control sheet is 83% or less to bring the light control sheet into a first state, and applies a voltage such that haze of the light control sheet according to JIS K 7136 is 15% or less to bring the light control sheet into a second state. The clarity is calculated from the following Formula (1): $100 \times (L_C - L_R)/(L_C + L_R) \ldots$ (1) where $L_C$ is an intensity of straight light traveling straight along a traveling direction of parallel light entering the light control sheet, and $L_R$ is an intensity of narrow-angle scattered light having an angle within $\pm 2.5°$ relative to the traveling direction of the parallel light, in light that has passed through the light control sheet.

10 Claims, 3 Drawing Sheets

(51) Int. Cl.
*G02F 1/1343* (2006.01)
*G02F 1/1334* (2006.01)
*G02F 1/133* (2006.01)

(58) Field of Classification Search
CPC ................. G02F 1/1335; G02F 1/1337; G02F 1/133738; G02F 1/133742; G02F 1/133757; G02F 1/1343; G02F 1/13439
See application file for complete search history.

(56) References Cited

FOREIGN PATENT DOCUMENTS

| | | |
|---|---|---|
| JP | 2018-031870 A | 3/2018 |
| JP | 6493598 B1 | 4/2019 |

OTHER PUBLICATIONS

Extended European Search Report dated Nov. 28, 2022, in corresponding European Patent Application No. 20883059.6, 8 pages.

\* cited by examiner

LIGHT CONTROL DEVICE

CROSS-REFERENCE TO RELATED APPLICATIONS

The present application is a continuation of International Application No. PCT/JP2020/040822, filed Oct. 30, 2020, which is based upon and claims the benefits of priority to Japanese Application No. 2019-200182, filed Nov. 1, 2019. The entire contents of all of the above applications are incorporated herein by reference.

BACKGROUND OF THE INVENTION

Field of the Invention

The present invention relates to a light control device.

Discussion of the Background

The light control device includes a light control sheet and a driver circuit. The light control sheet includes a light control layer and a pair of transparent electrodes sandwiching the light control layer therebetween in a thickness direction of the light control layer. The light control layer contains, for example, a polymer network which contains a plurality of voids, and a liquid crystal composition containing a plurality of liquid crystal molecules and filled in the voids. The driver circuit applies a voltage between the pair of transparent electrodes. In the light control sheet, the transmittance of the light control layer changes as the orientation state of the liquid crystal molecules changes corresponding to a potential difference between the pair of transparent electrode layers. The transmittance of the light control sheet is evaluated using haze, which is a ratio of diffuse transmittance to total light transmittance (for example, see JP 2018-31870 A).

SUMMARY OF THE INVENTION

According to an aspect of the present invention, a light control device includes a light control sheet including a first transparent electrode layer, a second transparent electrode layer, and a light control layer which includes a plurality of liquid crystal molecules and is formed between the first transparent electrode layer and the second transparent electrode layer, and a driver circuit which applies different voltages between the first transparent electrode layer and the second transparent electrode layer, and switches states of the light control sheet between a first state which is an opaque state and a second state which is a transparent state based on switching of alignment of the liquid crystal molecules according to the voltages. The driver circuit applies a voltage such that clarity of the light control sheet is 83% or less to bring the light control sheet into the first state. The driver circuit applies a voltage such that haze of the light control sheet according to JIS K7136 is 15% or less to bring the light control sheet into the second state. The clarity is calculated by Formula (1):

$$100 \times (L_C - L_R)/(L_C + L_R) \quad (1)$$

where $L_C$ is an intensity of straight light traveling straight along a traveling direction of parallel light entering the light control sheet, and $L_R$ is an intensity of narrow-angle scattered light having an angle within ±2.5° relative to the traveling direction of the parallel light, in light that has passed through the light control sheet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
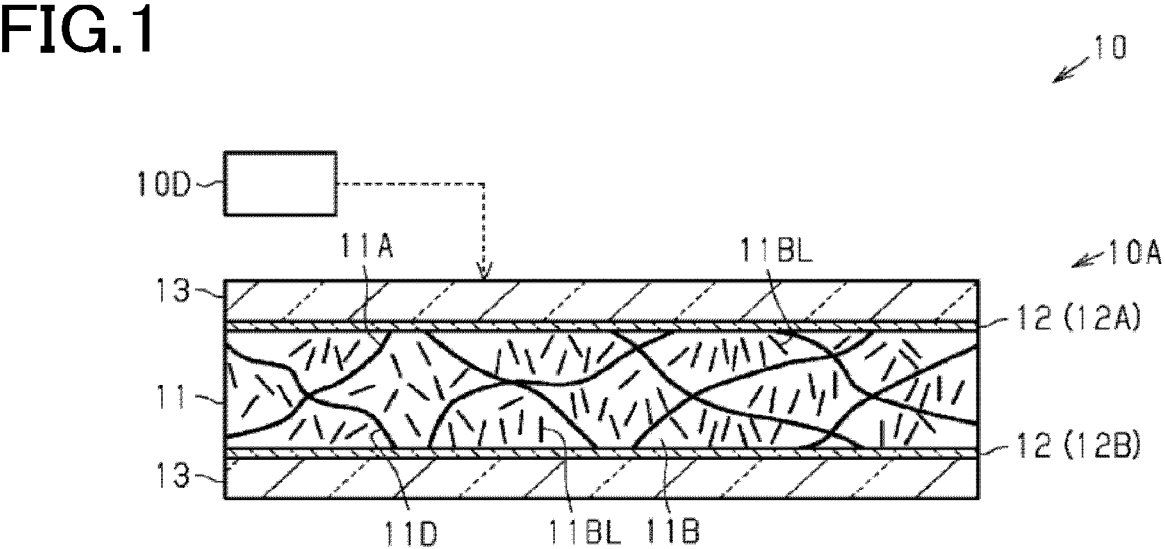
FIG. 1 is a cross-sectional view showing a state in which no drive voltage is applied to a light control layer, in a first configuration of a light control device.

The embodiments will now be described with reference to the accompanying drawings, wherein like reference numerals designate corresponding or identical elements throughout the various drawings.

One embodiment of a light control device will be described with reference to FIGS. 1 to 6. In the following description, a light control device, a method of calculating clarity, and Examples will be described in order. In the present embodiment, an object that is present behind the light control sheet, e.g., an object whose secrecy is desired to be kept by the light control sheet, is collectively referred to as a concealment target. Examples of the concealment target may include a person, a device, and a stationary object.

<Light Control Device>

Referring to FIGS. 1 to 4, a light control device will be described.

The light control device according to the present embodiment includes a first configuration and a second configuration as will be described below.

<First Configuration>

Figure 2:
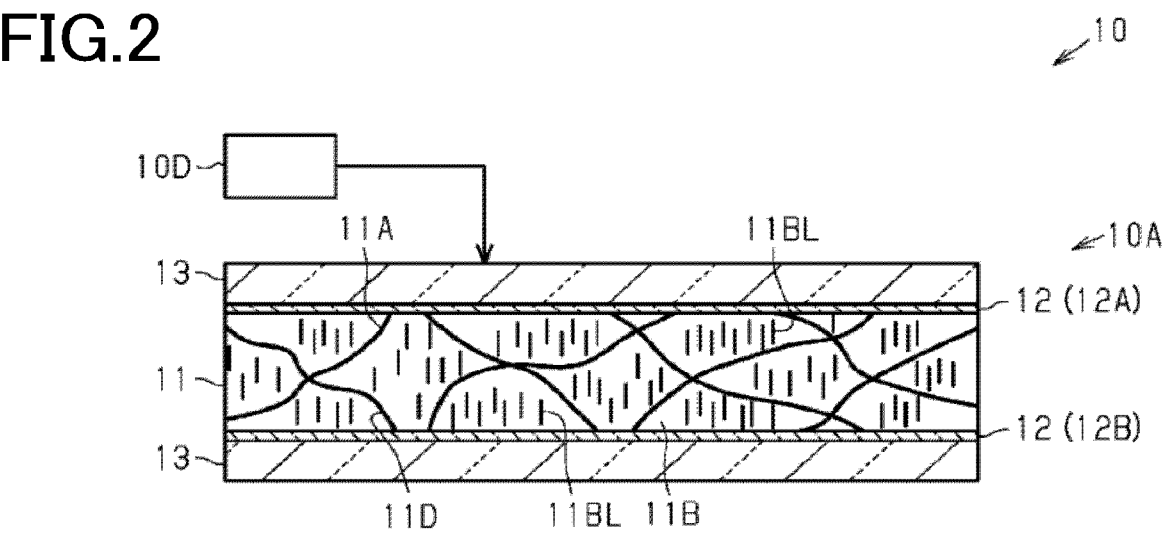
FIG. 2 is a cross-sectional view showing a state in which a drive voltage is applied to the light control layer, in the first configuration of the light control device.

Referring to FIGS. 1 and 2, a first configuration of the light control device will be described.

FIG. 1 shows a state in which no drive voltage is applied to a light control sheet in the first configuration of the light control device. The drive voltage is a voltage for changing alignment of liquid crystal molecules contained in a light control layer of the light control sheet. On the other hand, FIG. 2 shows a state in which in the first configuration of the light control device, a saturation voltage, which is a voltage that is unlikely to cause the orientation of the liquid crystal molecules to change with an increase in drive voltage, is applied. In the first configuration, as the magnitude of the drive voltage applied to the light control sheet increases, the alignment of the liquid crystal molecules changes from the alignment shown in FIG. 1 toward the alignment shown in FIG. 2.

As shown in FIG. 1, a light control device 10 includes a light control sheet 10A. The light control sheet 10A includes a light control layer 11, a pair of transparent electrode layers 12, and a pair of transparent substrates 13. In the present embodiment, the light control layer 11 includes a polymer network 11A and a liquid crystal composition 11B. The polymer network 11A contains a plurality of voids 11D. The voids 11D are voids defined in the polymer network 11A. The voids 11D may be spaces isolated from each other by the polymer network 11A or may be spaces communicating with other voids 11D. The liquid crystal composition 11B contains a plurality of liquid crystal molecules 11BL filled in the voids 11D. The alignment of the liquid crystal molecules 11BL contained in the light control layer 11 changes, so that a transmittance of the light control layer 11 changes.

The pair of transparent electrode layers 12 is composed of a first transparent electrode layer 12A and a second transparent electrode layer 12B. The light control layer 11 is positioned between the first transparent electrode layer 12A and the second transparent layer 12B, and the pair of transparent electrode layers 12 sandwich the light control layer 11 in the thickness direction of the light control layer 11. The transparent electrode layers 12 are transparent to light in the visible light region. Materials for forming the transparent electrode layers 12 may be, for example, transparent conductive oxides (TCO) and conductive polymers. The pair of transparent substrates 13 sandwich the pair of transparent electrode layers 12 therebetween in the thickness direction of the light control layer 11. The transparent substrates 13 are transparent to light in the visible light region. Materials for forming the transparent substrates 13 may be, for example, glass and synthetic resins.

The light control device 10 further includes a driver circuit 10D connected to the light control sheet 10A. The driver circuit 10D applies a drive voltage between the first transparent electrode layer 12A and the second transparent electrode layer 12B. The magnitude of the drive voltage applied to the transparent electrode layers 12, the alignment of the liquid crystal molecules contained in the light control layer 11 changes, so that a haze value and a clarity value in the light control sheet 10A change.

The driver circuit 10D changes the voltage applied between the first transparent electrode layer 12A and the second transparent electrode layer 12B, and, upon switching of the alignment of the liquid crystal molecules 11BL following the change in the voltage, switches the state of the light control sheet 10A between the first state and the second state. In the light control sheet 10A, the first state is an opaque state, and the second state is a transparent state.

The driver circuit 10D applies a voltage such that the clarity value of the light control sheet 10A is 83% or less to switch the light control sheet 10A to the first state. The first state is an opaque state, for example, the most opaque state of the light control sheet 10A. The driver circuit 10D applies a voltage such that the haze value of the light control sheet 10A is 15% or less to switch the light control sheet 10A to the second state. The second state is a transparent state, for example, the most transparent state of the light control sheet 10A. Haze is a parameter according to JIS K 7136:2000. On the other hand, clarity is a parameter defined by Formula (1) which will be described later.

The driver circuit 10D is configured to select either one of operation modes, a first mode and a second mode, and drive the light control sheet 10A in the selected mode. The selection of drive in the driver circuit 10D is performed according to, for example, input of an external operation signal.

In the first mode, an absolute value of a variation in clarity value per unit voltage is larger than an absolute value of a variation in haze value per unit voltage. When the driver circuit 10D drives the light control sheet 10A in the first mode, the light control sheet 10A includes the first state and any other state. The driver circuit 10D uses an absolute value of a ratio of the variation in haze value per unit voltage to the variation in clarity value per unit voltage as an index parameter, and drives the light control sheet 10A so that the index parameter is within a predetermined range. That is, the driver circuit 10D selectively applies a plurality of voltages at which the index parameter is less than 1 at different timings, whereby the light control sheet is brought into the first state or any other state in which the index parameter is less than 1. When the driver circuit 10D drives the light control sheet 10A in the first mode, the driver circuit 10D selectively applies a voltage corresponding to each set value of clarity. When the unit voltage is 1 V, the driver circuit 10D preferably applies a voltage at which the absolute value of the ratio of the variation in haze value per unit voltage to the variation in clarity value per unit voltage is 0.1 or less to bring the light control sheet 10A into the first state.

In the second mode, the absolute value of the variation in haze value per unit voltage is equal to or more than the absolute value of the variation in clarity value per unit voltage. When the driver circuit 10D drives the light control sheet 10A in the second mode, the light control sheet 10A includes the second state and any other state. The driver circuit 10D selectively applies a plurality of voltages at which the index parameter is 1 or more at different timings, whereby the light control sheet is brought into the second state or any other state in which the index parameter is 1 or more. When the driver circuit 10D is driven in the second mode, the driver circuit 10D selectively applies a voltage corresponding to each set value of haze. When the unit voltage is 5 V, the driver circuit 10D preferably applies a voltage in a range in which the absolute value of the ratio of the variation in haze value per unit voltage to the variation in clarity value per unit voltage is continuously or intermittently 80 or more to bring the light control sheet 10A into the second state.

A variation $\Delta H$ in haze when the drive voltage applied to the light control sheet 10A is changed from a drive voltage $V_1$ to a drive voltage $V_2$ is calculated from the following Formula (2). It should be noted that $H_1$ is a value of haze when drive voltage $V_1$ is applied, and $H_2$ is a value of haze when drive voltage $V_2$ is applied. Further, the drive voltage $V_2$ is larger than the drive voltage $V_1$, and a value obtained by subtracting the drive voltage $V_1$ from the drive voltage $V_2$ is a unit voltage $(V_2-V_1)$, i.e., a variation $\Delta V$ in applied voltage.

$$\Delta H = (H_2 - H_1)/(V_2 - V_1) \quad (2)$$

Also, a change $\Delta C$ in clarity when a drive voltage applied to the light control sheet 10A is changed from drive voltage $V_1$ to drive voltage $V_2$ is calculated from the following Formula (3). It is noted that $C_1$ is a value of clarity when drive voltage $V_1$ is applied, and $C_2$ is a value of clarity when drive voltage $V_2$ is applied. Also, drive voltage $V_2$ is greater than drive voltage $V_1$.

$$\Delta C = (C_2 - C_1)/(V_2 - V_1) \quad (3)$$

An absolute value of the variation in haze per unit voltage calculated from the above Formula (2) is $|\Delta H|$, and an absolute value of the variation in clarity calculated from the above Formula (3) is $|\Delta C|$. An absolute value of a ratio of the variation in haze value per unit voltage to the variation in clarity value per unit voltage is $|H|/\Delta C|$.

The first state described above includes a state defined by the following Formula (4), and the second state includes a state defined by the following Formula (5).

$$|\Delta H| < |\Delta C| \quad (4)$$

$$|\Delta H| \geq |\Delta C| \quad (5)$$

The light control sheet 10A includes a first characteristic and a second characteristic. The first characteristic and the second characteristic are alternately exhibited corresponding to the alignment of the liquid crystal molecules 11BL in the light control layer 11. In the first characteristic, the absolute value of the variation in clarity value per unit voltage is larger than the absolute value of the variation in haze value per unit voltage. In the second characteristic, the absolute value of the variation in haze value per unit voltage is equal to or more than the absolute value of the variation in clarity value per unit voltage. The first characteristic is defined by the above Formula (4), and the second characteristic is defined by the above Formula (5).

The driver circuit 10D applies a drive voltage corresponding to a predetermined value of clarity between the transparent electrode layers 12 to cause the light control sheet 10A to exhibit the first characteristic. Also, the driver circuit 10D applies a drive voltage corresponding to a predetermined value of haze between the transparent electrode layers 12 to cause the light control sheet 10A to exhibit the second characteristic. In this way, in the state where the first characteristic is exhibited in the light control sheet 10A, a predetermined value of clarity that governs the degree of scattering which is an index of turbidity can be obtained in that state. As described above, in the state where the second characteristic is exhibited in the light control sheet 10A, a predetermined value of haze that governs the degree of scattering which is an index of sheerness can be obtained in that state.

In the first characteristic, the unit voltage ($V_2-V_1$) is preferably 5 V or less, and more preferably 1 V or less. Also, in the second characteristic, the unit voltage ($V_2-V_1$) is preferably 5 V or less. As compared with the case where the unit voltage ($V_2-V_1$) is higher than 5 V, superiority of clarity in the first characteristic and superiority of haze in the second can be obtained, even though the change in voltage value applied to the light control sheet 10A is smaller. Therefore, compared to when the unit voltage ($V_2-V_1$) is more than 5 V, the degree of scattering can be more precisely controlled in the characteristics. As described above, no drive voltage is being applied to the pair of transparent electrode layers 12 in the light control device 10 shown in FIG. 1. In this case, the liquid crystal molecules 11BL in the voids 11D are randomly oriented. Accordingly, the light that is incident on either of the pair of transparent substrates 13 and enters the light control device 10 is isotropically scattered in the light control layer 11. As a result, the haze value in the light control sheet 10A is higher and the clarity value is lower than when the drive voltage is applied to the light control sheet 10A. The light control sheet 10A shown in FIG. 1 is an example of the above-described first state.

As described above, in the light control sheet 10A shown in FIG. 2, the driver circuit 10D applies a saturation voltage to the pair of transparent electrode layers 12. The alignment of the liquid crystal molecules 11BL that was previously random is changed, for example, to a vertical alignment allowing light to be transmitted therethrough. In other words, the liquid crystal molecules 11BL are positioned in the voids 11D so that the long axes of the liquid crystal molecules 11BL will be substantially perpendicular to the plane in which the light control layer 11 is provided. Therefore, the light that has entered the light control sheet 10A through either of the pair of transparent substrates 13 passes through the light control layer 11 without being substantially scattered in the light control layer 11. At this time, the haze value in the light control sheet 10A is lower and the clarity value is higher than those when no drive voltage is not applied to the light control sheet 10A. The light control sheet 10A shown in FIG. 2 shows an example of the above-mentioned second state.

<Second Configuration>

Figure 3:
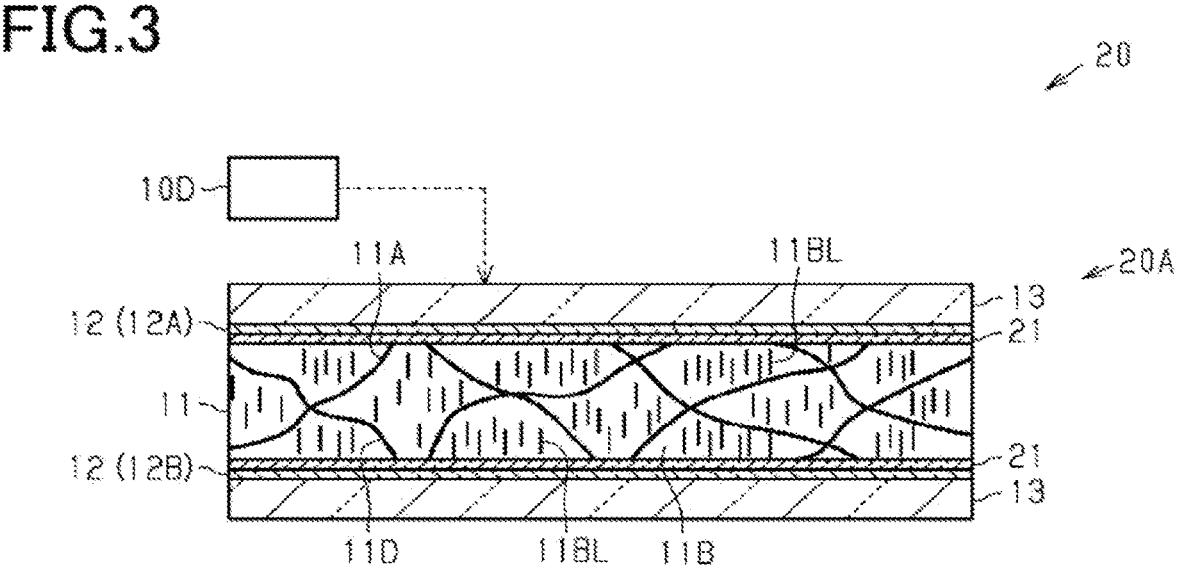
FIG. 3 is a cross-sectional view showing a state in which no drive voltage is applied to a light control layer, in a second configuration of the light control device.
Figure 4:
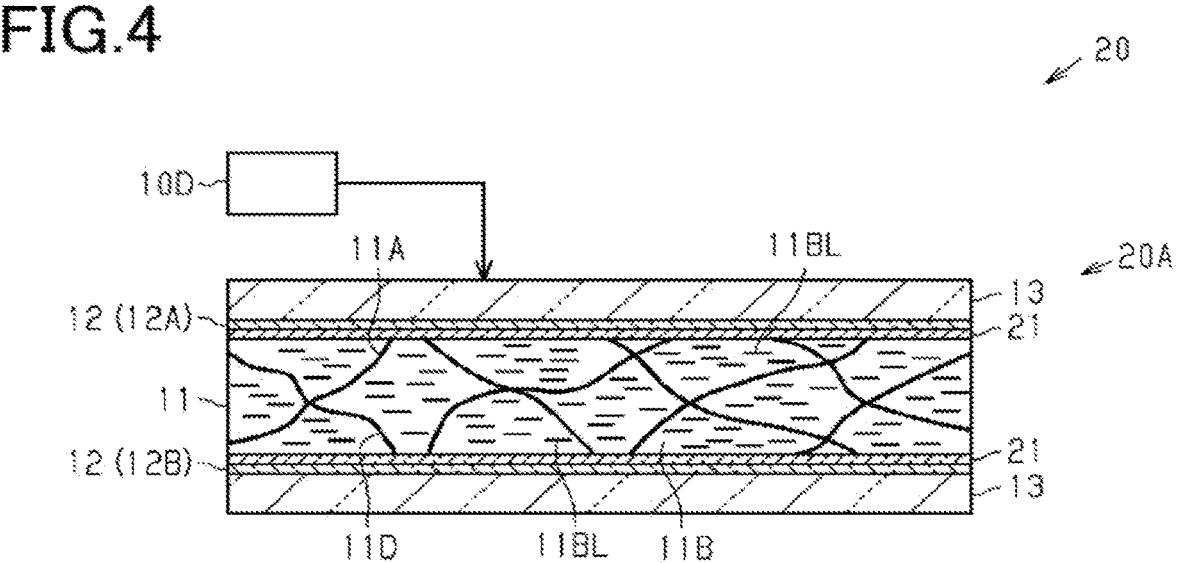
FIG. 4 is a cross-sectional view showing a state in which a drive voltage is applied to the light control layer, in the second configuration of the light control device.

Referring to FIGS. 3 and 4, a second configuration of the light control device will be described.

FIG. 3 shows a state in which no drive voltage is applied to the light control sheet in a second configuration of the light control device, whereas FIG. 4 shows a state in which a saturation voltage, which is an example of the drive voltage, is applied to the light control sheet in the second configuration of the light control device. In the second configuration, as the magnitude of the drive voltage applied to the light control sheet increases, the alignment of the liquid crystal molecules changes from the alignment shown in FIG. 3 to the alignment shown in FIG. 4.

FIG. 3 shows a light control device 20 including a light control sheet 20A which includes a pair of alignment layers 21, in addition to a light control layer 11, a pair of transparent electrodes 12, and a pair of transparent substrates 13. The pair of alignment layers 21 sandwich the light control layer 11 therebetween in the thickness direction of the light control layer 11, and are positioned closer to the center portion of the light control sheet 20A than the pair of transparent electrode layers 12 in the thickness direction of the light control layer 11. In other words, one alignment layer 21 is positioned between the light control layer 11 and a first transparent electrode layer 12A, and the other alignment layer 21 is positioned between the light control layer 11 and a second transparent electrode layer 12B.

The driver circuit 10D applies a voltage such that the clarity value of the light control sheet 20A is 83% or less to switch the light control sheet 20A to a first state. The first state is an opaque state, for example, the most opaque state of the light control sheet 20A. The driver circuit 10D applies a voltage such that the haze value of the light control sheet 20A is 15% or less to switch the light control sheet 20A to a second state. The second state is a transparent state, for example, the most transparent state of the light control sheet 20A.

The driver circuit 10D is configured to select, as operation modes, either of a first mode and a second mode, and drive the light control sheet 20A in the selected mode. The selection of drive in the driver circuit 10D is performed according to, for example, input of an external operation signal.

In the first mode, an absolute value of a variation in clarity value per unit voltage is larger than an absolute value of a variation in haze value per unit voltage. When the driver circuit 10D drives the light control sheet 20A in the first mode, the light control sheet 20A includes the first state and any other state. The driver circuit 10D selectively applies a plurality of voltages at which the index parameter is less than 1 at different timings, whereby the light control sheet is brought into the first state or any other state in which the index parameter is less than 1. When the driver circuit 10D drives the light control sheet 20A in the first mode, the driver circuit 10D selectively applies a voltage corresponding to each set value of clarity.

In the second mode, the absolute value of the variation in haze value per unit voltage is equal to or more than the absolute value of the variation in clarity value per unit voltage. When the driver circuit 10D drives the light control sheet 20A in the second mode, the light control sheet 20A includes the second state and any other state. The driver circuit 10D selectively applies a plurality of voltages at which the index parameter is 1 or more at different timings, whereby the light control sheet is brought into the second state or any other state in which the index parameter is 1 or more. When the driver circuit 10D drives the light control sheet 20A in the second mode, the driver circuit 10D selectively applies a voltage corresponding to each set value of haze.

In the light control device 20, similarly to in the light control device 10, the light control sheet 20A alternately exhibits a first characteristic and a second characteristic. In the first characteristic, the absolute value of the variation in clarity value per unit voltage is larger than the absolute value of the variation in haze value per unit voltage. In the first characteristic, the unit voltage ($V_2$-$V_1$) is preferably 5 V or less, and more preferably 1 V or less. In the second characteristic, the absolute value of the variation in haze value per unit voltage is equal to or more than the absolute value of the variation in clarity value per unit voltage. In the second characteristic, the unit voltage ($V_2$-$V_1$) is preferably 5 V or less.

The driver circuit 10D applies a drive voltage corresponding to a predetermined value of clarity between the transparent electrode layers 12 to cause the light control sheet 20A to exhibit the first characteristic, similarly to the driver circuit 10D of the light control device 10. Also, the driver circuit 10D applies a drive voltage corresponding to a predetermined value of haze between the transparent electrode layers 12 to cause the light control sheet 20A to exhibit the second characteristic.

If the alignment layers 21 are vertical alignment layers, the liquid crystal molecules 11BL in the voids 11D are vertically aligned in the state in which no drive voltage is applied to the light control sheet 20A. In other words, the liquid crystal molecules 11BL are positioned in the voids 11D so that the long axes of the liquid crystal molecules 11BL will be substantially perpendicular to the plane in which the light control layer 11 is provided. Therefore, the light that has entered the light control sheet 20A through either of the pair of transparent substrates 13 passes through the light control layer 11 without being substantially scattered in the light control layer 11. Thus, the haze value in the light control sheet 20A is lower and the clarity value is higher than those when no drive voltage is applied to the light control sheet 20A. The light control sheet 20A shown in FIG. 3 shows an example of the above-mentioned second state.

As described above, in the light control sheet 20A shown in FIG. 4, the driver circuit 10D applies a saturation voltage to the pair of transparent electrode layers 12. This changes the alignment of the liquid crystal molecules 11BL. For example, the alignment of the liquid crystal molecules 11BL changes from a vertical alignment to a horizontal alignment. In this case, the liquid crystal molecules 11BL are positioned in the voids 11D so that the long axes of the liquid crystal molecules 11BL will extend parallel to the plane in which the light control layer 11 is provided. Accordingly, the light that is incident on either one of the pair of transparent substrates 13 and enters the light control sheet 20A is scattered in the light control layer 11. At this time, the haze value in the light control sheet 20A is higher and the clarity value is lower than those when no drive voltage is applied to the light control sheet 20A. The light control sheet 20A shown in FIG. 4 shows an example of the above-mentioned first state.

<Method of Calculating Clarity>

Figure 5:
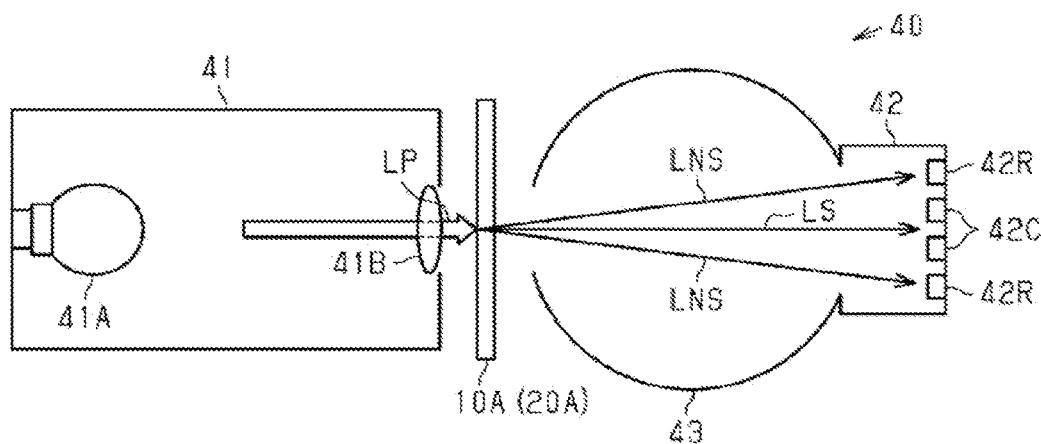
FIG. 5 is a schematic device configuration diagram showing a configuration of a measurement device for clarity, together with a light control device as an object to be measured.

Referring to FIG. 5, a method of calculating clarity will be described. FIG. 5 schematically shows an example of a measurement device used for measuring clarity.

As shown in FIG. 5, a measurement device 40 used for measuring clarity includes an illumination part 41, a light-receiving part 42, and an integrating sphere 43. The illumination part 41 includes a light source 41A and a lens 41B. The light source 41A is a white LED, and the lens 41B converts the light emitted from the light source 41A into parallel light. The light-receiving part 42 includes a center sensor 42C and an outer peripheral sensor 42R. The center sensor 42C and the outer peripheral sensor 42R are annularly shaped. The outer peripheral sensor 42R is positioned outside the center sensor 42C. The measurement device 40 can be used for measuring not only clarity but also haze of an object to be measured. The integrating sphere 43 of the measurement device 40 is used only for measuring haze.

In the measurement device 40, a light control sheet 10A or 20A is placed between the illumination part 41 and the integrating sphere 43. The flux of parallel light emitted from the lens 41B has a diameter of 14 mm in the present embodiment. The light that has passed through the light control sheet 10A or 20A includes straight light LS and narrow-angle scattered light LNS. The straight light LS travels straight along a traveling direction of parallel light LP that has entered the light control layer 11. The narrow-angle scattered light LNS has an angle within ±2.5° relative to the traveling direction of the parallel light LP. In the light-receiving part 42, the center sensor 42C receives the straight light LS, and the outer peripheral sensor 42R receives the narrow-angle scattered light LNS. The intensity of the straight light LS received by the center sensor 42C is defined to be $L_C$, and the intensity of the narrow-angle scattered light LNS received by the outer peripheral sensor 42R is defined to be $L_R$.

The clarity is calculated from the following Formula (1):

$$100 \times (L_C - L_R)/(L_C + L_R) \tag{1}$$

where $L_C$ is the intensity of the straight light LS travelling straight along the travelling direction of the parallel light LP that has entered the light control sheet 11, among light that has passed through the light control sheet 11, and $L_R$ is the intensity of the narrow-angle scattered light LNS having an angle of within ±2.5° relative to the travelling direction of the parallel light LP.

In this manner, clarity is a parameter for evaluating the state of the light control sheet 10A or 20A using the narrow-angle scattered light. Therefore, clarity can be used for evaluating the degree of sharpness of very small portions of a concealment target in an image of the object via the light control sheet 10A or 20A. Thus, when an observer visually recognizes a concealment target through the light control sheet 10A or 20A, the contour of the concealment target through the light control sheet 10A or 20A, i.e., the sharpness of the concealment target, is lowered as the value of clarity in the light control sheet 10A or 20A decreases. In this manner, clarity is used for evaluating the sharpness of an image of a concealment target visually recognized through the light control sheet 10A or 20A.

<Method of Calculating Haze>

The haze of the light control sheet 10A or 20A can be calculated by using the light intensity measured by using the measurement device 40. Haze is calculated using a method according to JIS K 7136:2000, as described above. When measuring haze using the measurement device 40, the light that has passed through the light control sheet 10A or 20A is received by the light-receiving part disposed in the integrating sphere 43.

The term haze refers to a percentage of transmitted light that has passed through the light control sheet 10A or 20A and has deviated from the traveling direction of incident light by 2.5° or more due to forward scattering. In other words, in haze measurement, parallel light refers to light having an angle of less than ±2.5° relative to the traveling direction of the parallel light LP, and wide-angle scattered light refers to light having an angle of ±2.5° or more relative to the traveling direction of the parallel light LP. The transmittance of the wide-angle scattered light is defined as a diffuse transmittance $T_d$, the transmittance of the parallel light is defined as a parallel light transmittance $T_p$, and the sum of the parallel light transmittance $T_p$ and the diffuse transmittance $T_d$ is defined as a total light transmittance $T_t$. In this case, haze is the ratio of the diffuse transmittance $T_d$ to the total light transmittance $T_t$.

In this way, haze is a parameter for evaluating the state of the light control sheet 10A or 20A by using wide-angle scattered light. Therefore, haze can be used for evaluating the degree of turbidity of the light control sheet 10A or 20A as a whole perceived by the observer when visually observing the light control sheet 10A or 20A. Thus, when an observer visually recognizes a concealment target through the light control sheet 10A or 20A, the contrast between the concealment target through the light control sheet 10A or 20A and the surrounding of the concealment target is lowered as the value of haze in the light control sheet 10A or 20A increases. Accordingly, the concealment target appears blurred to the observer.

Moreover, in the light control sheet 10A or 20A, the absolute value of the variation in one of the clarity value and the haze value per unit voltage is larger than the absolute value of the variation in the other, in mutually different ranges within the entire range of the drive voltage applied to the light control sheet 10A or 20A. In a first range within the entire range of the drive voltage applied to the light control sheet 10A or 20A, the absolute value of the variation in clarity per unit voltage is larger than the absolute value of the variation in haze. In a second range, which is different from the first range, the absolute value of the variation in haze per unit voltage is larger than the absolute value of the variation in clarity per unit voltage.

Furthermore, when a drive voltage in the first range is applied to the light control sheet 10A or 20A, the value of haze may be higher while the value of clarity may be lower, compared to when a drive voltage in the second range is applied to the light control sheet 10A or 20A. In other words, when a drive voltage in the first range is applied to the light control sheet 10A or 20A, the transmittance of the light control sheet 10A or 20A may be lower, compared to when a drive voltage in the second range is applied to the light control sheet 10A or 20A.

In other words, when a drive voltage contained in the second range is applied to the light control sheet 10A or 20A, the value of haze may be lower while the value of clarity may be higher, compared to when a drive voltage contained in the first range is applied to the light control sheet 10A or 20A. In other words, when a drive voltage in the second range is applied to the light control sheet 10A or 20A, the transmittance of the light control sheet 10A or 20A may be higher, compared to when a drive voltage in the first range is applied to the light control sheet 10A or 20A.

Therefore, for example, during the manufacture of the light control sheet 10A or 20A, the performance of the light control sheet 10A or 20A can be managed by using the clarity value in a range with a relatively low transmittance of the light control sheet 10A or 20A. This makes it possible to suppress variations in performance of the light control sheet 10A or 20A in a specific driven state. On the other hand, in a range with a relatively high transmittance of the light control sheet 10A or 20A, the performance of the light control sheet 10A or 20A is managed by using the haze value, thereby making it possible to suppress variations in performance of the light control sheet 10A or 20A in a specific driven state.

As a result, in the manufacturing stage of the light control sheet 10A or 20A, it is possible to suppress the occurrence of discrepancies in the recognition of an object through the light control sheet 10A or 20A by the observer between the products.

Further, for example, during drive of the light control sheet 10A or 20A, the magnitude of the drive voltage applied to the light control sheet 10A or 20A can be controlled using the clarity value in the range with a relatively low transmittance of the light control sheet 10A or 20A. This makes it possible to suppress variations in performance of the light control sheet 10A or 20A in a specific driven state. On the other hand, in a range in which the transmittance of the light control sheet 10A or 20A is relatively high, a value of haze is used to control the magnitude of a drive voltage applied to the light control sheet 10A or 20A in order to suppress the variance in performance of the light control sheet 10A or 20A when the light control sheet 10A or 20A is in a specific drive state.

As a result, the occurrence of discrepancies in recognition of an object through the light control sheet 10A or 20A can be suppressed when driving the light control sheet 10A or 20A which involves stepwise control of the light control sheet 10A or 20A.

EXAMPLES

Examples of the light control device will be described below.

A light control sheet having a polymer network type light control layer was prepared. A light control device was obtained by electrically connecting, to the light control sheet, a driver circuit outputting a drive voltage to the light control sheet. In the present example, a light control sheet included in the light control device having the above-mentioned first configuration was prepared. While changing the magnitude of the drive voltage to be applied to the light control sheet, the haze value and clarity value of the light control sheet were measured.

The haze value of the light control sheet was measured by using a haze meter (NDH7000SD manufactured by Nippon Denshoku Industries Co., Ltd.) and using a method according to JIS K 7136:2000. Further, the value of clarity of the light control sheet was calculated by using a haze/transparency measuring instrument (Haze Guard i, manufactured by BYK-Gardner) and using the above calculation method. From the calculated haze value and clarity value, an absolute value |ΔH/ΔC| of a ratio of a variation ΔH in haze value per unit voltage to a variation ΔC in clarity value per unit voltage was calculated.

Figure 6:
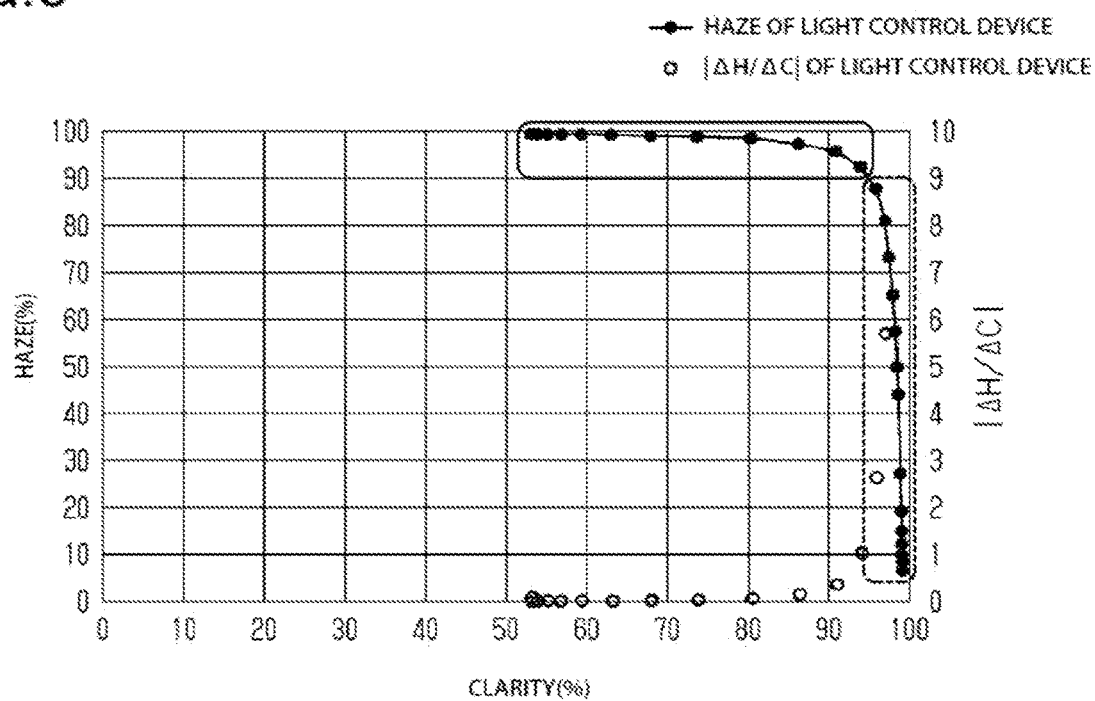
FIG. 6 is a graph showing a relationship between haze and clarity in the light control sheet.

Measurement results of haze and clarity were as shown in FIG. 6 and Table 1. Calculation results of set values are as shown in Table 1. The "*" mark shown in Table 1 indicates that the variation ΔC in value of clarity per unit voltage is zero. In FIG. 6, the range surrounded by the solid line indicates a relationship between the haze value and the clarity value obtained when a drive voltage having a value in the range of 0 V or more and 12 V or less was applied to the light control sheet. Also, in FIG. 6, the range surrounded by the broken line indicates a relationship between the haze value and the clarity value obtained when a drive voltage having a value in the range of 13 V or more and 100 V or less was applied to the light control sheet. Further, in FIG. 6, a slope of an absolute value |ΔH/ΔC| of a ratio of a variation ΔH of haze value per unit voltage to a variation ΔC in clarity value per unit voltage is similar to a slope of a graph composed of the haze value and the clarity value.

TABLE 1

| VOLTAGE (V) | HAZE (%) | CLARITY (%) | \|ΔH/ΔC\| |
|---|---|---|---|
| 0 | 98.8 | 53.8 | — |
| 1 | 98.9 | 53.2 | 0.1 |
| 2 | 98.9 | 53.3 | 0.0 |
| 3 | 98.9 | 54.0 | 0.0 |
| 4 | 98.8 | 55.2 | 0.0 |
| 5 | 98.8 | 56.8 | 0.0 |
| 6 | 98.7 | 59.4 | 0.0 |
| 7 | 98.7 | 63.2 | 0.0 |
| 8 | 98.5 | 68.0 | 0.0 |
| 9 | 98.2 | 73.8 | 0.0 |
| 10 | 97.8 | 80.5 | 0.1 |
| 11 | 96.8 | 86.4 | 0.2 |
| 12 | 95.2 | 91.0 | 0.4 |
| 13 | 91.9 | 94.1 | 1.0 |
| 14 | 87.1 | 95.9 | 2.7 |
| 15 | 80.4 | 97.1 | 5.6 |
| 16 | 72.5 | 97.7 | 13.2 |
| 17 | 64.3 | 98.2 | 16.4 |
| 18 | 56.7 | 98.4 | 38.1 |
| 19 | 49.9 | 98.6 | 33.9 |
| 20 | 44.1 | 98.7 | 57.6 |
| 25 | 27.0 | 99.0 | 57.2 |
| 30 | 19.2 | 99.1 | 77.9 |
| 35 | 15.0 | 99.1 | * |
| 40 | 12.5 | 99.2 | 25.2 |
| 45 | 10.8 | 99.2 | * |
| 50 | 9.7 | 99.2 | * |
| 55 | 8.9 | 99.2 | * |
| 60 | 8.3 | 99.2 | * |
| 65 | 7.8 | 99.2 | * |
| 70 | 7.4 | 99.2 | * |
| 75 | 7.2 | 99.2 | * |
| 80 | 6.9 | 99.2 | * |
| 85 | 6.7 | 99.2 | * |
| 90 | 6.6 | 99.2 | * |
| 95 | 6.5 | 99.2 | * |
| 100 | 6.4 | 99.3 | 1.1 |

As shown in FIG. 6, it was found that, when the drive voltage applied to the light control sheet was within the range of 0 V or more and 12 V or less, the clarity value changed sharply due to the change in magnitude of the drive voltage, while the haze value hardly changed even when the magnitude of the drive voltage changed.

On the contrary, it was found that, when the drive voltage applied to the light control sheet was within the range of 13 V or more and 100 V or less, the haze value changed sharply due to the change in magnitude of the drive voltage, while the clarity value hardly changed even when the magnitude of the drive voltage changed.

Further, it was found that the absolute value of the ratio of the variation in haze value per unit voltage to the variation in clarity value per unit voltage approached 0 as the clarity value decreased.

As indicated in Table 1, it was found that the clarity value was 83% or less when a drive voltage within the range of 0 V or more and 10 V or less was applied to the light control sheet. Also, it was found that the haze value was 15% or less when a drive voltage within the range of 35 V or more and 100 V or less was applied to the light control sheet.

Further, as indicated in Table 1, when a drive voltage within the range of 0 V or more and 12 V or less was applied to the light control sheet, the absolute value of the ratio of the variation in haze value per unit voltage to the variation in clarity value per unit voltage was less than 1. In other words, it was found that the absolute value of the variation in clarity value per unit voltage was larger than the absolute value of the variation in haze value per unit voltage.

On the other hand, it was found that, when a drive voltage within the range of 13 V or more and 100 V or less was applied to the light control sheet, the absolute vale of the ratio of the variation in haze value per unit voltage to the variation in clarity value per unit voltage was 1 or more. In other words, it was found that the absolute value of the variation in haze value per unit voltage was equal to or more than the absolute value of the variation in clarity value per unit voltage.

As described above, according to one embodiment of the light control device, the following advantageous effects can be achieved.

(1) In the light control sheet 10A or 20A in the first state, the value of clarity depending on narrow-angle scattering in which the scattering angle of the light entering the light control sheet 10A or 20A is within 2.5° is 83% or less. Therefore, the degree of scattering by the light control sheet 10A or 20A indicates sufficient opacity in recognition of an object through the light control sheet 10A or 20A. In the light control sheet 10A or 20A in the second state, the value of haze depending on wide-angle scattering in which the scattering angle of the light entering the light control sheet 10A or 20A is more than 2.5° is 15% or less. Therefore, the degree of scattering by the light control sheet 10A or 20A shows sufficient transparency in recognition of an object through the light control sheet 10A or 20A. Therefore, it is possible to suppress the occurrence of discrepancies in recognition of an object through the light control sheet 10A or 20A, as compared with the configuration in which the degree of scattering is managed by a single parameter such as haze.

(2) When the light control sheet 10A or 20A is driven in the first mode, the voltage applied between the first transparent electrode layer 12A and the second transparent electrode layer 12B is a value corresponding to the set value of clarity. That is, in the light control sheet 10A or 20A driven in the first mode, each set value of clarity that governs the change in degree of scattering is obtained by application of a voltage. As a result, it is also possible to select a preset degree of scattering without causing any discrepancies in recognition of an object through the light control sheet 10A or 20A.

(3) When the light control sheet 10A or 20A is driven in the second mode, the voltage applied between the first transparent electrode layer 12A and the second transparent electrode layer 12B is a value corresponding to the set value of haze. That is, in the light control sheet 10A or 20A driven in the second mode, each set value of haze that governs the change in degree of scattering is obtained by application of a voltage. As a result, it is also possible to select a preset degree of scattering without causing any discrepancies in recognition of an object through the light control sheet 10A or 20A.

(4) When the light control sheet 10A or 20A is transparent, it is possible to enhance the effectiveness of obtaining the effect of suppressing discrepancies similar to the above (1).

(5) When the light control sheet 10A or 20A is opaque, it is possible to enhance the effectiveness of obtaining the effect of suppressing discrepancies similar to the above (1).

The embodiment described above may be modified and implemented as follows.

<Driver Circuit>

The driver circuit 10D does not have to apply a drive voltage corresponding to a predetermined value of clarity to the light control sheet 10A or 20A, when causing the light control sheet 10A or 20A to be brought into the first state. In this case, the driver circuit 10D may apply a drive voltage corresponding to a predetermined value of haze.

Further, the driver circuit 10D does not have to apply a drive voltage corresponding to a predetermined value of haze to the light control sheet 10A or 20A, when causing the light control sheet 10A or 20A to be brought into the second state. In this case, the driver circuit 10D may apply a drive voltage corresponding to a predetermined value of clarity.

Even in these cases, the driver circuit 10D can switches the state of the light control sheet 10A or 20A between the first state and the second state, thereby making it possible to suppress the occurrence of discrepancies between the light control sheets, i.e., discrepancies in the observer's recognition of an object through the light control sheets, for example, in the manufacturing stage for the light control sheet 10A or 20A. Therefore, advantageous effects similar to (1) described above can be considerably achieved.

The driver circuit 10D may be capable of switching the state of the light control sheet 10A or 20A among three or more states including the first state and the second state. In this case, the driver circuit 10D can switch the state of the light control sheet 10A or 20A to a third state in which the clarity value of the light control sheet 10A or 20A is included within the range between the value in the first state and the value in the second state, and the haze value is included in the range between the value in the first state and the value in the second state. The driver circuit 10D applies, to the light control sheet 10A or 20A, a drive voltage different from the drive voltage when the light control sheet 10A or 20A is set to the first state and the drive voltage when the light control sheet 10A or 20A is set to the second state, thereby making it possible to set the state of the light control sheet 10A or 20A to the third state.

The light control device 10 or 20 may further include a control unit that controls the drive of the light control device 10 or 20 in order to change the transmittance of the light control sheet 10A or 20A. In this case, the control unit includes information, such as a table, for converting mutually different hazes for bringing the states of the light control sheets 10A and 20A into the second state into drive voltages, and applies, to the driver circuit, a drive voltage which is correlated to the haze designated, for example, by an external operation device. In addition, the control unit includes information, such as a table, for converting mutually different clarities for bringing the states of the light control sheets 10A and 20A into the first state into drive voltages, and applies, to the driver circuit, a drive voltage which is correlated to the clarity designated, for example, by an external operation device. The light control device 10 or 20 provided with such a control unit can enhance the effectiveness of obtaining the effect of suppressing discrepancies in recognition of an object through the light control sheet.

<Light Control Sheet>

The light control sheets 10A and 20A may have a characteristic different from the first characteristic and the second characteristic. The light control sheets 10A and 20A may have either one of the first characteristic and the second characteristic and a characteristic different from the first characteristic and the second characteristic. Alternatively, the light control sheets 10A and 20A may have a characteristic different from the first characteristic and the second characteristic in addition to the first characteristic and the second characteristic.

In this case, the light control sheets 10A and 20A can exhibit the first characteristic and, for example, a third characteristic by changing the blending ratio of the liquid crystal composition 11B in the light control layer 11. Further, in the light control sheets 10A and 20A having, in the light control layer, a spacer for maintaining a gap between the pair of transparent electrode layers in the light control layer, the density of the spacer in the light control layer is changed, and thus can exhibit the first characteristic and, for example, the third characteristic. In the third characteristic, the variation in clarity value per unit voltage and the variation in haze value per unit voltage are substantially equal.

The unit voltage can be any value in the range of 5 V or more and 10 V or less. Regardless of which value in the above range is employed as the unit voltage, the driver circuit 10D switches the state of the light control sheet 10A or 20A between the first state and the second state, whereby advantageous effects similar to (1) described above can be achieved.

The shapes of the light control sheets 10A and 20A may each be a planar shape, a curved surface shape having a curvature in the two-dimensional direction, or a curved surface shape having a curvature in the three-dimensional direction. The light control sheets 10A and 20A can be provided with a transparent substrate 13 having flexibility. In this case, the light control sheets 10A and 20A are also well adapted to curved surface processing for the light control sheets 10A and 20A.

<Light Control Layer>

The light control layer 11 is not limited to the polymer network type liquid crystal. The light control layer 11 may be, for example, a polymer-dispersed liquid crystal (PDCL) or a nematic curvilinear aligned phase (NCAP).

The light control layer 11 contains a dichroic dye and may exhibit a predetermined color derived from the dichroic dye. Even in this case, if the driver circuit 10D is configured to switch the state of the light control sheet 10A or 20A between the first state and the second state, advantageous effects similar to (1) described above can be obtained.

The present application addresses the following. The value of haze of the light control sheet changes corresponding to a change in an applied voltage within a predetermined range, and exhibits substantially a constant value with respect to a change in an applied voltage outside the predetermined range. On the other hand, a degree of scattering of the light control sheet indicates a turbidity, i.e., a degree of turbidity, when driven so as to be transparent, and also indicates sense of transparency, i.e., a degree of transparency, at the time of opaque drive. Further, although the haze value is almost constant outside the predetermined range of the applied voltage, the degree of scattering of the light control sheet varies depending on the change in applied voltage outside the predetermined range. As a result, the degrees of scattering may be different even between light control sheets having equal haze values. Due to a difference in degree of scattering, discrepancies in observer's recognition of an object through the light control sheet may occur.

An aspect of the present invention is to provide a light control device capable of suppressing the occurrence of discrepancies in recognition of an object through a light control sheet.

A light control device includes: a light control sheet including: a first transparent electrode layer, a second transparent electrode layer, and a light control layer, the light control layer containing liquid crystal molecules and being located between the first transparent electrode layer and the second transparent electrode layer; and a driver circuit configured to apply different voltages between the first transparent electrode layer and the second transparent electrode layer, and to switch a state of the light control sheet between a first state which is an opaque state and a second state which is a transparent state upon switching of alignment of the liquid crystal molecules according to values of the voltages. The driver circuit:

applies a voltage such that a value of clarity of the light control sheet is 83% or less to bring the light control sheet into the first state; and applies a voltage such that a value of haze of the light control sheet according to JIS K7136:2000 is 15% or less to bring the light control sheet into the second state.

The clarity is calculated from the following Formula (1):

$$100 \times (L_C - L_R)/(L_C + L_R) \quad (1)$$

where $L_C$ is an intensity of straight light traveling straight along a traveling direction of parallel light entering the light control sheet, and $L_R$ is an intensity of narrow-angle scattered light having an angle within ±2.5° relative to the traveling direction of the parallel light, in light that has passed through the light control sheet.

As described above, the haze value of the light control sheet varies corresponding to a change in applied voltage within a predetermined range of the applied voltage, and exhibits a substantially constant value, with respect to the change in applied voltage, outside the predetermined range of the applied voltage. On the other hand, the degree of scattering of the light control sheet also varies outside the predetermined range depending on the change in applied voltage, and the value of clarity depending on narrow-angle scattering also varies outside the predetermined range depending on the change in applied voltage.

In this respect, according to the light control device, in the light control sheet in the first state, the value of clarity depending on narrow-angle scattering is 83% or less. Therefore, the degree of scattering in the light control sheet indicates sufficient opacity in the recognition of an object through the light control sheet. Then, in the light control sheet in the second state, the haze value depending on wide-angle scattering in which an angle relative to the traveling direction of the parallel light is larger than ±2.5° is 15% or less. Thus, the degree of scattering in the light control sheet indicates sufficient transparency in the recognition of an object through the light control sheet. Therefore, it is possible to suppress the occurrence of discrepancies in recognition of an object through the light control sheet, as compared with a configuration in which the degree of scattering is managed by a single parameter such as haze. For example, in the evaluation result of the transmittance of the light control sheet during production of the light control sheet, and in the result of driving the light control sheet such that the transmittance of the light control sheet changes in a stepwise manner, the occurrence of discrepancies between the light control sheets can be suppressed. That is, it is possible to suppress the occurrence of discrepancies in recognition of an object through the light control sheet by an observer.

Obviously, numerous modifications and variations of the present invention are possible in light of the above teachings. It is therefore to be understood that within the scope of the appended claims, the invention may be practiced otherwise than as specifically described herein.

What is claimed is:

1. A light control device, comprising:
a light control sheet including a first transparent electrode layer, a second transparent electrode layer, and a light control layer which includes a plurality of liquid crystal molecules and is formed between the first transparent electrode layer and the second transparent electrode layer; and
a driver circuit configured to apply different voltages between the first transparent electrode layer and the second transparent electrode layer, and to switch states of the light control sheet between a first state which is an opaque state and a second state which is a transparent state based on switching of alignment of the liquid crystal molecules according to the voltages,
wherein the driver circuit applies a voltage such that clarity of the light control sheet is 83% or less to bring the light control sheet into the first state,
the driver circuit applies a voltage such that haze of the light control sheet according to JIS K7136 is 15% or less to bring the light control sheet into the second state, and
the clarity is calculated by Formula (1):

$$100 \times (L_C - L_R)/(L_C + L_R) \quad (1)$$

where $L_C$ is an intensity of straight light traveling straight along a traveling direction of parallel light entering the light control sheet, and $L_R$ is an intensity of narrow-angle scattered light having an angle within ±2.5° relative to the traveling direction of the parallel light, in light that has passed through the light control sheet.

2. The light control device according to claim 1, wherein the driver circuit is configured to drive the light control sheet in a first mode where an absolute value of a variation in the clarity per unit voltage is larger than an absolute value of a variation in the haze per unit voltage,
when the driver circuit drives the light control sheet in the first mode, the light control sheet is in the first state, and
in the first mode, the driver circuit is configured to selectively apply a voltage corresponding to each set value of the clarity.

3. The light control device according to claim 2, wherein the driver circuit is configured to drive the light control sheet in a second mode where an absolute value of a variation in the haze per unit voltage is equal to or more than the absolute value of the variation in the clarity per unit voltage,
when the driver circuit drives the light control sheet in the second mode, the light control sheet is in the second state; and
in the second mode, the driver circuit is configured to selectively apply a voltage corresponding to each set value of the haze.

4. The light control device according to claim 2, wherein the unit voltage is 5 V, and
the driver circuit is configured to apply a voltage in a range in which an absolute value of a ratio of the variation in the haze per the unit voltage to the variation in the clarity per the unit voltage is continuously or intermittently 80 or more to bring the light control sheet into the second state.

5. The light control device according to claim 2, wherein the unit voltage is 1 V, and
the driver circuit is configured to apply a voltage such that the absolute value of the ratio of the variation in the haze per the unit voltage to the variation in the clarity per the unit voltage is 0.1 or less to bring the light control sheet into the first state.

6. The light control device according to claim 1, wherein the driver circuit is configured to drive the light control sheet in a second mode where an absolute value of a variation in the haze per unit voltage is equal to or more than the absolute value of the variation in the clarity per unit voltage,
when the driver circuit drives the light control sheet in the second mode, the light control sheet is in the second state; and
in the second mode, the driver circuit is configured to selectively apply a voltage corresponding to each set value of the haze.

7. The light control device according to claim 6, wherein the unit voltage is 5 V, and
the driver circuit is configured to apply a voltage in a range in which an absolute value of a ratio of the variation in the haze per the unit voltage to the variation in the clarity per the unit voltage is continuously or intermittently 80 or more to bring the light control sheet into the second state.

8. The light control device according to claim 6, wherein the unit voltage is 1 V, and
the driver circuit is configured to apply a voltage such that the absolute value of the ratio of the variation in the haze per the unit voltage to the variation in the clarity per the unit voltage is 0.1 or less to bring the light control sheet into the first state.

9. The light control device according to claim 1, wherein the unit voltage is 5 V, and
the driver circuit is configured to apply a voltage in a range in which an absolute value of a ratio of the variation in the haze per the unit voltage to the variation in the clarity per the unit voltage is continuously or intermittently 80 or more to bring the light control sheet into the second state.

10. The light control device according to claim 1, wherein the unit voltage is 1 V, and
the driver circuit is configured to apply a voltage such that the absolute value of the ratio of the variation in the haze per the unit voltage to the variation in the clarity per the unit voltage is 0.1 or less to bring the light control sheet into the first state.

* * * * *